Dec. 16, 1952 P. V. McCASH 2,621,869
COMBINATION SPINNING AND CASTING FISHING REEL
Filed Oct. 18, 1949 3 Sheets-Sheet 2
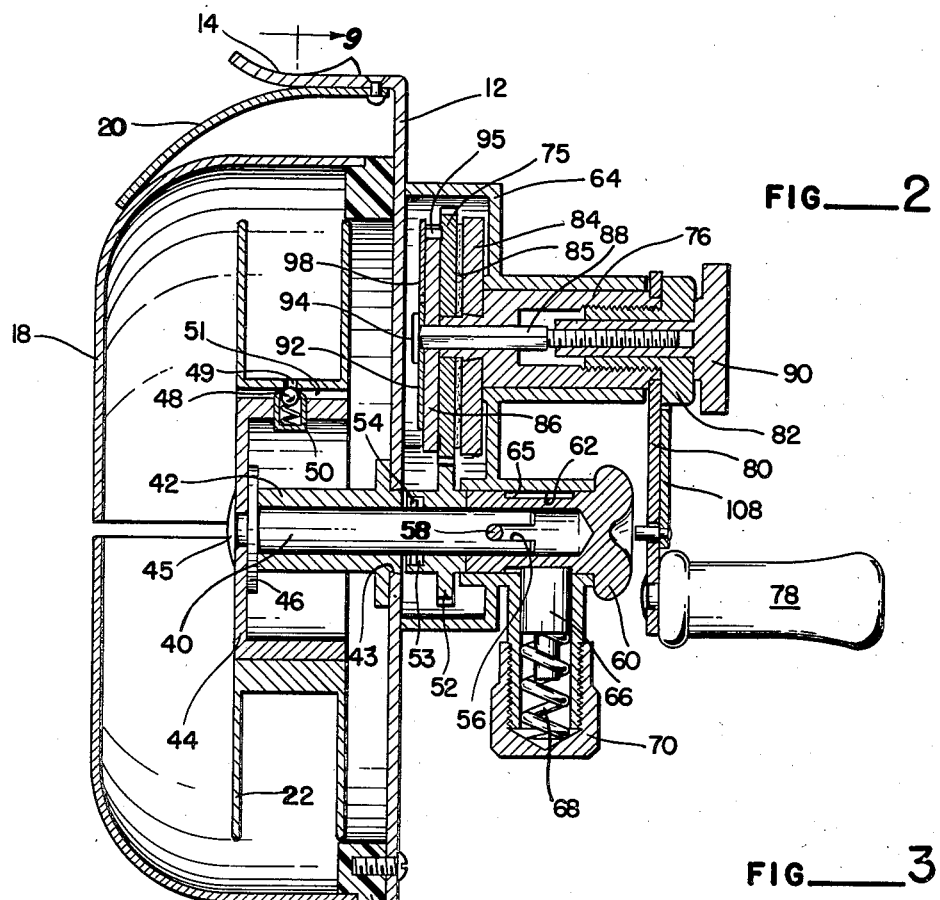
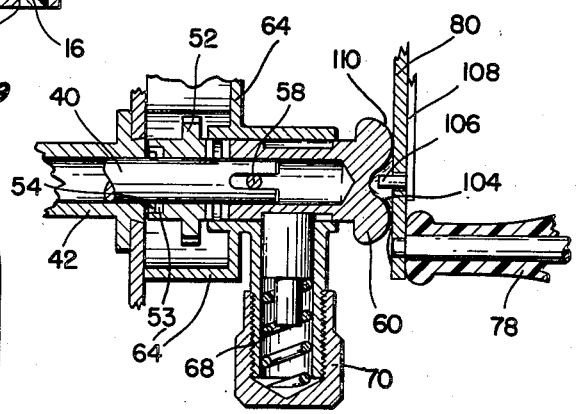
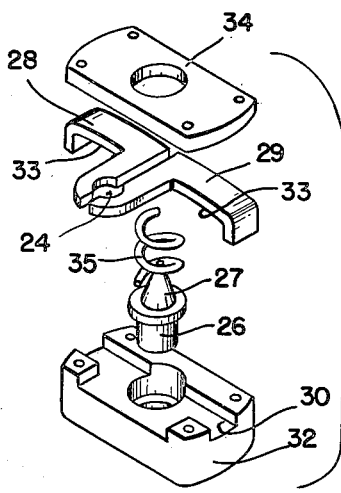
PERRY V. MC CASH
Inventor
By Smith & Tuck
Attorneys Dec. 16, 1952      P. V. McCASH      2,621,869
COMBINATION SPINNING AND CASTING FISHING REEL
Filed Oct. 18, 1949      3 Sheets-Sheet 3
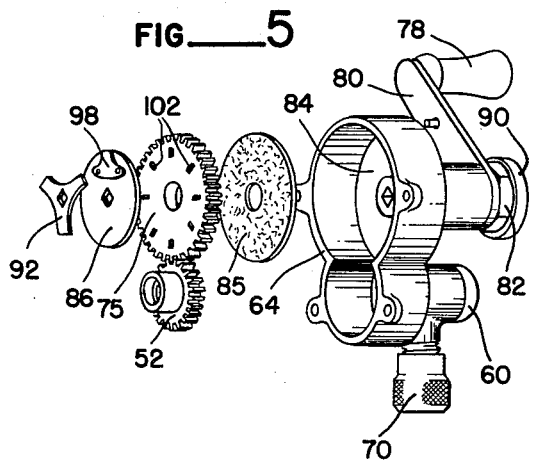
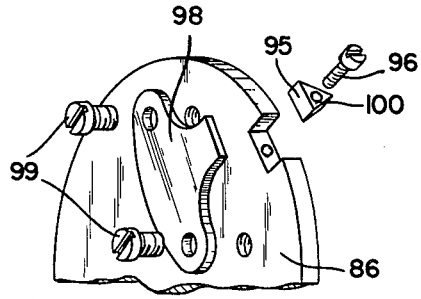
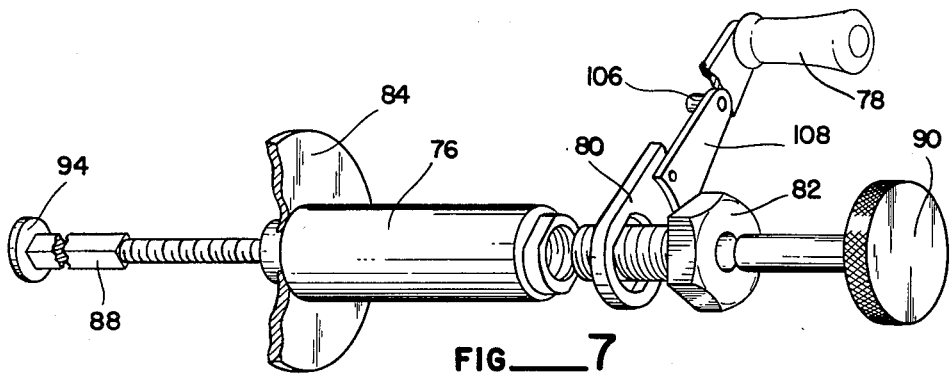
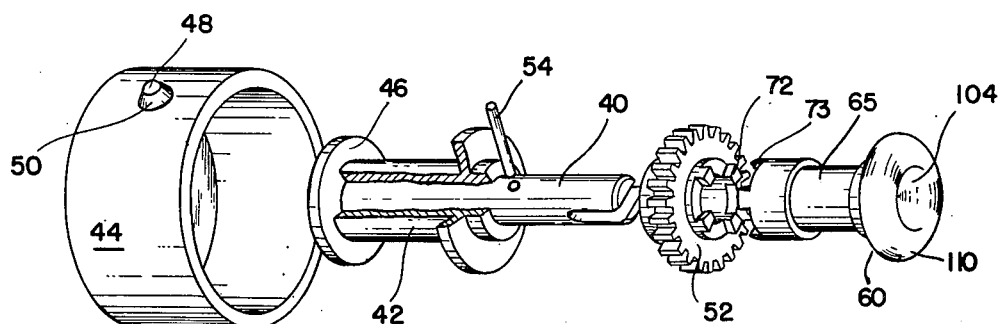
PERRY V. MC CASH
Inventor
By *Smith & Tuck*
Attorneys Patented Dec. 16, 1952

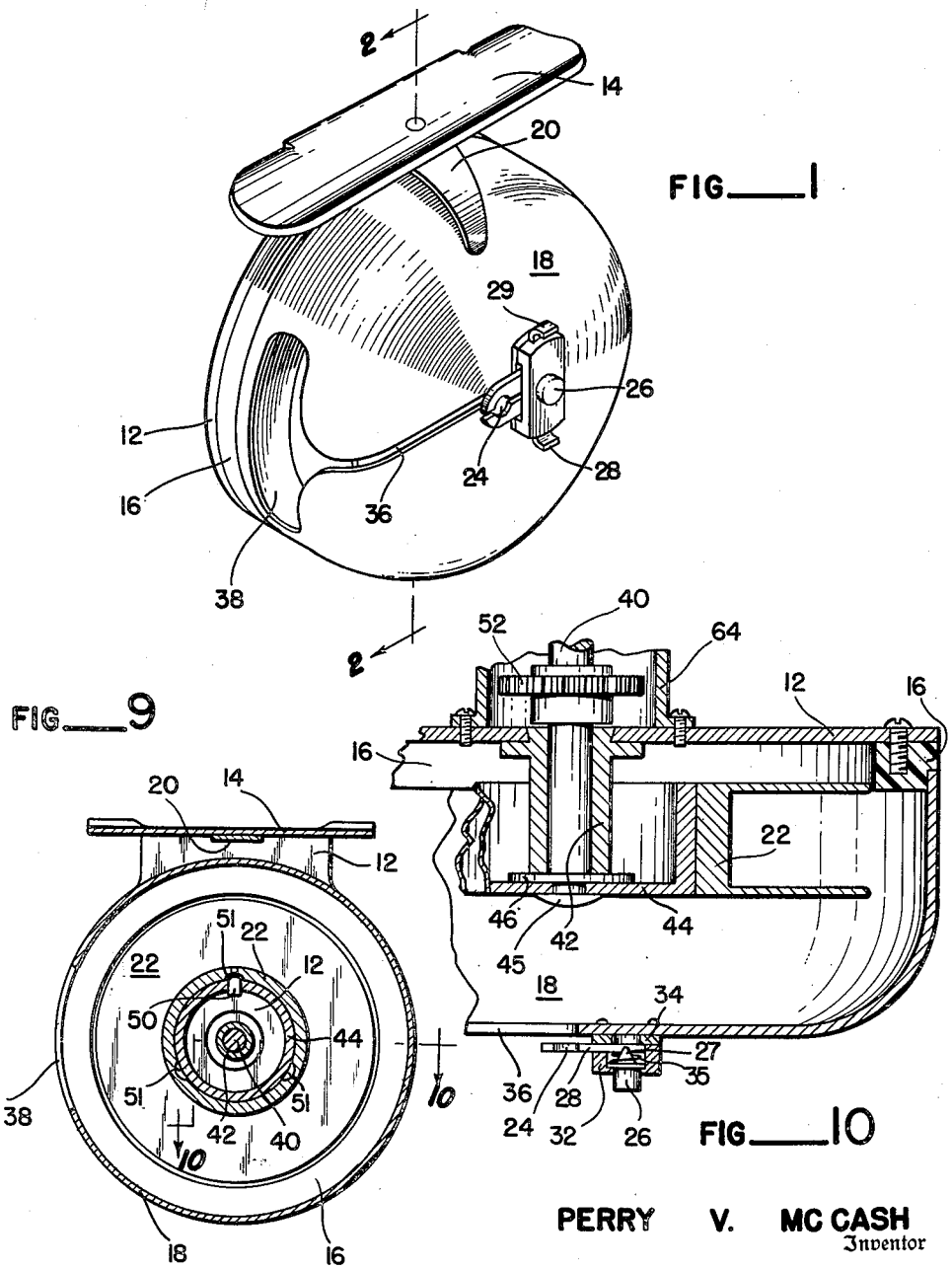

2,621,869

UNITED STATES PATENT OFFICE 2,621,869

COMBINATION SPINNING AND CASTING FISHING REEL

Perry V. McCash, Seattle, Wash.

Application October 18, 1949, Serial No. 121,971

2 Claims. (Cl. 242—84.6)

This present fishing reel is of the type which can be used as a spinning reel, wherein the spool of the reel is stationary during the casting and the line comes off the end of the stationary reel and passes through a guide, which is on the axis of revolution of the spool. For the spinning type of fishing, the reel functions much like the conventional spinning reel during the cast, and the spool is revolved to wind in the line cast. The axis of the spool is at right angles to the axis of the rod and is intended for use on the fly fishing type of rods.

Means are provided for shifting the guiding point of the line from the axis of the spool to a point in the plane of the spool, so that the butt guide of the pole can act as the guiding point in the spooling operation. In order to adapt this reel to other forms of fishing, such as fly casting; trolling, still fishing and bait casting, means is provided for disconnecting the spool from the handle mechanism so that the spool is of the so-called free spool type, thus making it unnecessary for the fisherman to overcome the natural frictional resistance of the step-up gear train, which is employed to increase the revolutions of the spool over that of the operating handle or crank. Means are also provided for varying the frictional drag on the spool at all times, thus especially adapting this reel for trolling and the like.

In recent years, since the general acceptance of the spinning type of casting of light lures, many reels have been provided for this specialized form of fishing. However, of those reels which have been observed, the very nature of the design of those reels makes them high in price, and quite beyond the price range of a fisherman who desires to have equipment for the various types of fishing that come into common use during all seasons of the year. Many fishermen, who would like to avail themselves of spinning equipment, feel that it is a very substantial investment for rather limited periods of use, and one which they can, with difficulty, make, if they are going to have equipment for fly fishing, still fishing, trolling and other forms of casting. The present reel fills this need, in that it provides a single reel, which is comparable in general structural cost to a spinning reel, in which provision has been been made to readily adapt the reel to various types of fishing, and this without any added accessories, but rather, just different adjustment of the various elements of the reel, which is easily achieved while it is on the pole and fishing is being undertaken.

Another very expensive element in a spinning outfit, using the conventional spinning reel, is the pole itself. Spinning reels, normally, by their peculiar construction require a special grip and special means whereby the reel, which is of rather awkward construction, can be placed along the grip so as to provide adequate balance for the entire assembly. This present reel is very satisfactory for use on the ordinary pole having a conventional reel seat.

The principal object of my invention is to provide, in a fishing reel having the axis of rotation of the spool extending normal to the longitudinal axis of the fishing rod, a cover for said spool having a meridional slot and quickly releasable line guide means adjacent the end of said slot at the center of said cover.

Further objects, advantages and capabilities will be apparent from the description and disclosure in the drawings, or may be comprehended or are inherent in the device.

In the drawings:

Figure 1 is a perspective view showing the reel from the line guiding side;

Figure 2 is a cross sectional view taken generally along the line 2—2 of Figure 1 and shown on an enlarged scale;

Figure 3 is a fragmentary sectional view showing a portion of the mechanism of Figure 2 in a different adjusted position;

Figure 4 is a bracketed perspective view showing the elements comprising the line guiding and releasing mechanism;

Figure 5 is an exploded view showing the parts making the drive means;

Figure 6 is an enlarged perspective view showing, in exploded relationship, certain of the parts forming the click mechanism;

Figure 7 is an exploded view showing certain of the essential parts involved in the frictional engaging means between the operating handle and the driving gears;

Figure 8 is an exploded perspective view, partly in section, showing the means employed to provide the free spool arrangement;

Figure 9 is a cross-sectional view taken along line 9—9 of Figure 2;

Figure 10 is a fragmentary sectional view taken along the broken line 10—10 of Figure 9.

Referring more particularly to the disclosure in the drawings, the numeral 12 designates the frame plate. This plate is circular throughout most of its extent and forms the back frame member of the reel. At one point the metal is formed into the reel seat 14. This member can be conveniently made from the same piece as the frame plate, but it is not essential, as it can easily be made as a separate unit and suitably secured to the frame plate. Fixedly secured to frame plate 12 is the mating ring 16. This is an annular ring and serves as a seat and centering means for the cover 18. The cover is held in secure seating arrangement in seat 19 of the mating ring, by means of a cover clip 20, which is normally most easily secured to the reel seat, as after the showings of Figures 1 and 2. Cover 18 forms a cover for the line holding spool 22. It also serves, in part, to position the line guide on the axis of the spool 22 during the casting operations when using the reel for spinning. This is achieved by the mechanism shown in exploded form in Figure 4, and is perspective in Figure 1. Here it will be noted that a line guide is provided at 24. This opening should be disposed upon the axis of revolution of spool 22.

After a spinning cast has been made, the operator presses on the protruding button 26, and the pointed end of the button, as 27, acts to spread the two line guide members 28 and 29. These members are positioned in guideway 30, formed in the base block 32. Line guide members 28 and 29 are preferably slightly bowed as at 33 so that, when they are held in place by means of the cover plate 34, there will be a certain frictional retaining pressure, not so much that the tapering point 27 cannot spread them, but enough to hold them in their elected positions. When it is desired to close the same, the down-turned end of members 28 and 29 can be pressed inwardly, as with the thumb and forefinger, where the guide at 24 will again engage the line. A guide is provided for the line in the radially extending cut 36, in cover 18, and this terminates in the large line guide opening 38. This guide opening merely generally positions the line. It is intended that it will not be small enough to interfere with the natural spooling of the line, upon spool 22 as guided by the butt guide on the fishing rod.

Concentrically disposed with respect to the mating ring 16 and the circular portion of frame plate 12, is the hub shaft 40. This shaft is supported for revolution by the hub bearing 42, which is fixedly secured to frame plate 12 as by the swedging indicated at 43. This hub is provided with a flange which rests upon the frame plate to give added rigidity and stiffness. The hub shaft 40 has a spool hub 44 fixedly secured to it by swedging or riveting, as at 45. A flange 46, secured to shaft 40, gives additional rigidity in positioning the same to hub 44. At one point in the periphery of hub 44 a spring pressed ball is positioned by the pressed-in cage 50. The ball is disposed to seat in an opening 49 formed in the hub of spool 22, and holds the spool against movement longitudinally of hub 44. Preferably three equi-spaced keyways 51 are formed in the hub of spool 22 to engage cage 50 and prevent radial movement between the spool and hub 44.

On the outside of frame plate 12, shaft 40 has mounted on it, normally free to turn, the driven gear 52. This gear is counter-bored at 53 to provide a retaining means for pin 54 which serves to position shaft 40 longitudinally. At its extreme outer end shaft 40 is bifurcated at 56 to provide engaging means with the shift pin 58. Shift pin 58 is fixedly secured within the shift bushing 60. This bushing is positioned for limited reciprocations within its bearing portion 62, of gear case 64. This limited reciprocation is achieved by having an annular relieved portion at 65, into which is adapted to seat, friction plunger 66. Plunger 66 is curved on its end so as to partially encircle the reduced diameter portion of the shifting bushing 60. In this way, a limiting of the movement is provided with one extreme position shown in Figure 2, and the other extreme position shown in Figure 3. A compression spring 68 holds the plunger into contact with the shift bushing, and this contact is subject to change in pressure by adjustment of the cap nut 70. This also provides the adjustable frictional drag on the spool during the fishing operation.

Referring to Figure 8, it will be noted that the driven gear 52 is provided with one portion of a dental clutch at 72, and that the shift bushing 60 is also provided with a co-acting dental clutch portion 73. In Figure 2 these are shown as engaged, and in Figure 3 they are shown retracted so that there is no actual connection between gear 52 and shaft 40.

Disposed in meshing alignment with gear 52 is the driving gear 75. This gear merely floats on drive shaft 76 but has no driving connection with the shaft except through the friction drive means. This friction drive means consists of a number of parts whose function can best be understood from a study of Figures 2 and 5.

Turning or driving energy for the reel comes from the handle 78, through the crank arm 80, to the drive shaft 76. The end of drive shaft 76 is of irregular form, one type of which is shown in the exploded view of Figure 7. A clamp bushing 82 is provided to secure the crank arm in fixed, locked position with the drive shaft 76. Fixedly secured to shaft 76, as by swedging thereto, is the clutch face plate 84. This face plate is mounted on a stepped-down portion of drive shaft 76 so that it can accept the full thrust of the drive means. Frictional driving is achieved between face plate 84 and the driving gear 75. A preferred arrangement is to employ, between these two plates, the clutch friction washer 85. Disposed on the opposite side of gear 75 is the pressure plate 86. This plate and gear 75 are both free to move longitudinally of shaft 76, and pressure is obtained by means of the tension pin 88, which is squared at one portion where it passes through drive shaft 76 on pressure plate 86. At its opposite end pin 88 is provided with a threaded portion which is engaged by the tension nut 90, adjustment of which applies pressure on the pressure plate. Experience has proved that it is desirable to have a resilient element at this point, and this is provided in the clutch spring 92. The form of this clutch spring is best shown in Figure 5. The operation then is, that by the tightening of tension nut 90, the spring member 92 is compressed under the fixed head 94 of the tension pin and, as maximum pressure is then exerted, the spring will be flat against the pressure plate. This is the adjustment shown in Figure 2.

To provide a click, such as is common and is mostly used to indicate when the line is being payed out, or to indicate the movement of the spool, a click arrangement is provided which is probably best illustrated in Figures 5 and 6, with the general position of a click member 95 being indicated in Figure 2. Click member 95 is mounted upon a screw 96 for limited rotation about the axis of the same. A pressure spring is provided in spring 98 which is secured to pressure plate 86 by the screws 99. The point of click member 50, as 100, is disposed to successively engage slots 102 formed in the face of the driving gear 95.

The end of the shift bushing 60 is formed with a cam shaped recess 104, and adapted to co-act with this depression is the spring backed detent 106. This member is mounted preferably on a resilient spring 108 and operates the detent through an opening in crank arm 80. This detent has two functions: one, it gives a lodgment or positioning means so that the handle 78 can be retained in a definite position during certain types of fishing. An example is where it is desired to pay out line, as in trolling or in some forms of casting, and manually, the shift bushing is moved to the right as viewed in Figures 2 and 3, and 8, and the arrangement shown in Figure 3 then is in effect. When it is then desired to re-engage the dental clutches 72 and 73, which have been disengaged by the movement of shift bushing 60, a revolution of handle 78 will have the effect of moving detent 106 against the sloping cam surfaces of depression 104; this will at least partially make the shift. If it is not completed, and it cannot be completed unless the teeth of the dental clutch are in meshing relationship, the next revolution of the handle causes the detent 106 to engage the outer cam surfaces, as 110, and there, due to the resiliency of the detent mounting, there is an inward movement, and at the same time, the dental portion 72 is being revolved by the handle, and then easy engagement of the clutch is assured without any direct attention by the user.

*Method of operation*

In using this reel as in spinning, all the normal functions of such fishing are performed and this reel, in such use, has the line guided by the opening at 24, and with the line engaging members 28 and 29 in close engagement, so that a completely enclosed opening is thus provided for the guiding of the line. As a cast is made in the usual manner, the line is taken off of spool 22 in the same manner as the usual spinning reel. In other words, with the reel spool stationary, the line is taken off the end of the spool, consequently there is a need for the guide at 24, disposed co-axially with and some distance away from the spool. When the cast is complete, and it is desired to retrieve the line, the operator presses button 26. This compresses spring 35 and permits point 27 to enter in between the two members 28 and 29, and to spread them. A suitable V is provided between members 28 and 29 to permit the entry of point 27. As the line is released from the opening at 24 by this means, it follows out along slot 36 into the main guiding opening 38. Here the line is then coming in from the pole in the plane of the spool and, by having the opening 38 of substantially the proportions illustrated in Figure 1, the line will then be guided by the pole guide closest to the reel, but as these guides are normally spaced 24 inches or more from the reel, there is very little angularity to be overcome, and it has been found that the line will spool very evenly in spool 22. With the line fully retrieved, the line must again be caught in the opening at 24, and members 28 and 29 pressed together before the next cast is made, as each cast, in this type of fishing, requires this axial guide at 24.

Now assuming the fisherman desires to employ his reel as in fly fishing, in that case the line is not engaged in the opening at 24, but is allowed to come in and out of opening 38, and to spool, on spool 22, in the natural manner of the ordinary fly fishing reel. Now, fly fishermen quite often want to get out their full amount of line by successive casts, and between each cast it is desired to pull line off of the reel. This is best achieved by moving the shift bushings 60 to the right, as viewed in the position in Figure 3, and then the spool can be turned without the necessity of driving the gearings or the handle, as in this instance, the dental clutch members 72 and 73 are disengaged. The fisherman can, however, have any amount of tension he wishes on the spool by an adjustment of the cap nut 70. This adjustment forces friction plunger 66 up against the shift bushing and, as the shift bushing is still connected to shaft 49 by means of pins 58, the fisherman has full control.

If the reel is to be used, for instance, in trolling where it is desired to pay out a certain amount of line and then to troll with that given length of line, the fisherman, normally, will adjust the reel to hold the drag of the lure by means of the cap nut 70, which gives a full control of the spool, whether the dental clutch members are engaged or not. In trolling normally, however, it is desirable to know when line is being taken out and usually the better arrangement is to leave the clutch engaged, and then to rely on the relative movement of the pressure plate 86 carrying the click member 95 and the driving gear 75. Now the driving gear, under all conditions, is in mesh with the driven gear 52, consequently with the clutch engaged, the driving gear will revolve at about one-half the speed of the spool. The pressure plate 86, however, is not free to revolve in that it is mounted on the square portion of tension pin 86, and this same square portion extends through a square opening in a drive shaft 76, consequently there can be no movement of the pressure plate unless the handle 78 also moves. This gives an opportunity to obtain the same type of warning we get from many of the star drag type of reels, in that by proper adjusting of the tension nut 90 which, in turn, adjusts the frictional engagement of drive shaft 76 with the driving gear, it is possible to have this adjustment made so that, if a heavy fish surges on the line to a point where he might break it, the reel will give him extra line. This adjustment can be made to correspond to any line setting desired and the click moving across the various slots 102, in the driving gear, will give the audible click, thus warning the fisherman that while he may be apparently reeling in with the handle, his fish may actually be taking out line. This is a desirable feature of a reel and one which is common in a great number of reels, but which has not heretofore been so readily obtainable in a spinning or fly fishing type of reel.

It is believed that it will be clearly apparent from the above description and the disclosure in the drawings that the invention comprehends a novel construction of a combination spinning and casting fishing reel.

Having thus disclosed the invention, I claim:

1. In a fishing reel of the type having a frame plate, a shaft rotatably mounted in said frame plate with its axis at right angles to the longitudinal axis of the fishing rod, and a spool at one end of said shaft, the improvement, comprising: a cup-shaped hollow cover attached to said frame plate and covering said spool, having a meridional slot extending from near one edge to the center of said cover; a base guide block, attached to the outside of said cover near the center and opposite said meridional slot, having a T guideway on its inner surface with the base of the T directed toward said slot; two L-shaped guide members positioned in said T guideway with a leg of each in opposite wings of the T and the other legs positioned in the base of the T and extending outward over the center of said cover, said extended legs having opposite notches forming an enclosure over the center of said cover to receive a fishing line; said base block having a central opening perpendicular to said guide members; a button in said opening with one end extending outward and a pointed end extending inward between said guide members when the button is pressed down; and spring means positioned to urge said button to an outward position.

2. In a fishing reel of the type having a frame plate, a shaft rotatably mounted in said frame plate with its axis at right angles to the longitudinal axis of the fishing rod; and a spool at one end of said shaft, the improvement, comprising: a dome-shaped, circular hollow cover, attached to said frame plate and covering said spool, having a meridional slot extending from near one edge to the center of said cover, said slot being of a width slightly wider than a fishing line throughout its length except near the edge of said cover where it is substantially wider; and a line securing assembly positioned near the center of said cover for releasably retaining and guiding a line from said spool, said assembly including a pair of arms extending from the center of said cover to opposite sides of the adjacent end of said slot, said arms having opposed notches forming an enclosure over said slot to receive a fishing line, and said assembly including spring means for holding said arms together and a manually operable member for separating said arms to release fishing line from said notches.

PERRY V. McCASH.

REFERENCES CITED

The following references are of record in the file of this patent:

UNITED STATES PATENTS

| Number | Name | Date |
|---|---|---|
| 161,314 | Winans et al. | Mar. 23, 1875 |
| 175,227 | Winans et al. | Mar. 21, 1876 |
| 659,477 | Holzmann | Oct. 9, 1900 |
| 728,717 | Hunter | May 19, 1903 |
| 1,547,297 | Case | July 28, 1925 |
| 2,034,917 | Miller | Mar. 24, 1936 |
| 2,120,190 | Rickards et al. | June 7, 1938 |
| 2,299,156 | Lind | Oct. 20, 1942 |
| 2,327,469 | Teitsma | Aug. 24, 1943 |
| 2,439,298 | Horan | Apr. 6, 1948 |
| 2,551,320 | Ferguson | May 1, 1951 |